United States Patent [19]

Waugh

[11] 4,019,399
[45] Apr. 26, 1977

[54] ENDLESS POWER TRANSMISSION BELT

[75] Inventor: Dale L. Waugh, Springfield, Mo.

[73] Assignee: Dayco Corporation, Dayton, Ohio

[22] Filed: Jan. 21, 1976

[21] Appl. No.: 651,375

[52] U.S. Cl. .............................. 74/231 C; 74/234;
74/237; 156/138; 156/140

[51] Int. Cl.² ...................... F16G 1/28; F16G 5/00;
F16G 1/00; B29H 7/00

[58] Field of Search ................. 156/138, 140, 141;
74/231 C, 231 P, 233, 234, 237

[56] References Cited
UNITED STATES PATENTS

| | | |
|---|---|---|
| 2,274,515 | 2/1942 | Yelm ................................. 74/234 |
| 2,292,290 | 8/1942 | Robins ........................... 156/140 X |
| 2,884,797 | 5/1959 | Murray .................................. 74/233 |
| 3,800,610 | 4/1974 | Wach ............................... 74/231 C |
| 3,878,734 | 4/1975 | Zeldman et al. ............. 74/231 C X |

*Primary Examiner*—Leonard H. Gerin
*Attorney, Agent, or Firm*—Reuben Wolk

[57] ABSTRACT

A toothed endless power transmission belt made primarily of elastomeric material is provided and the belt has an arched cross-sectional configuration throughout its entire endless path.

19 Claims, 9 Drawing Figures

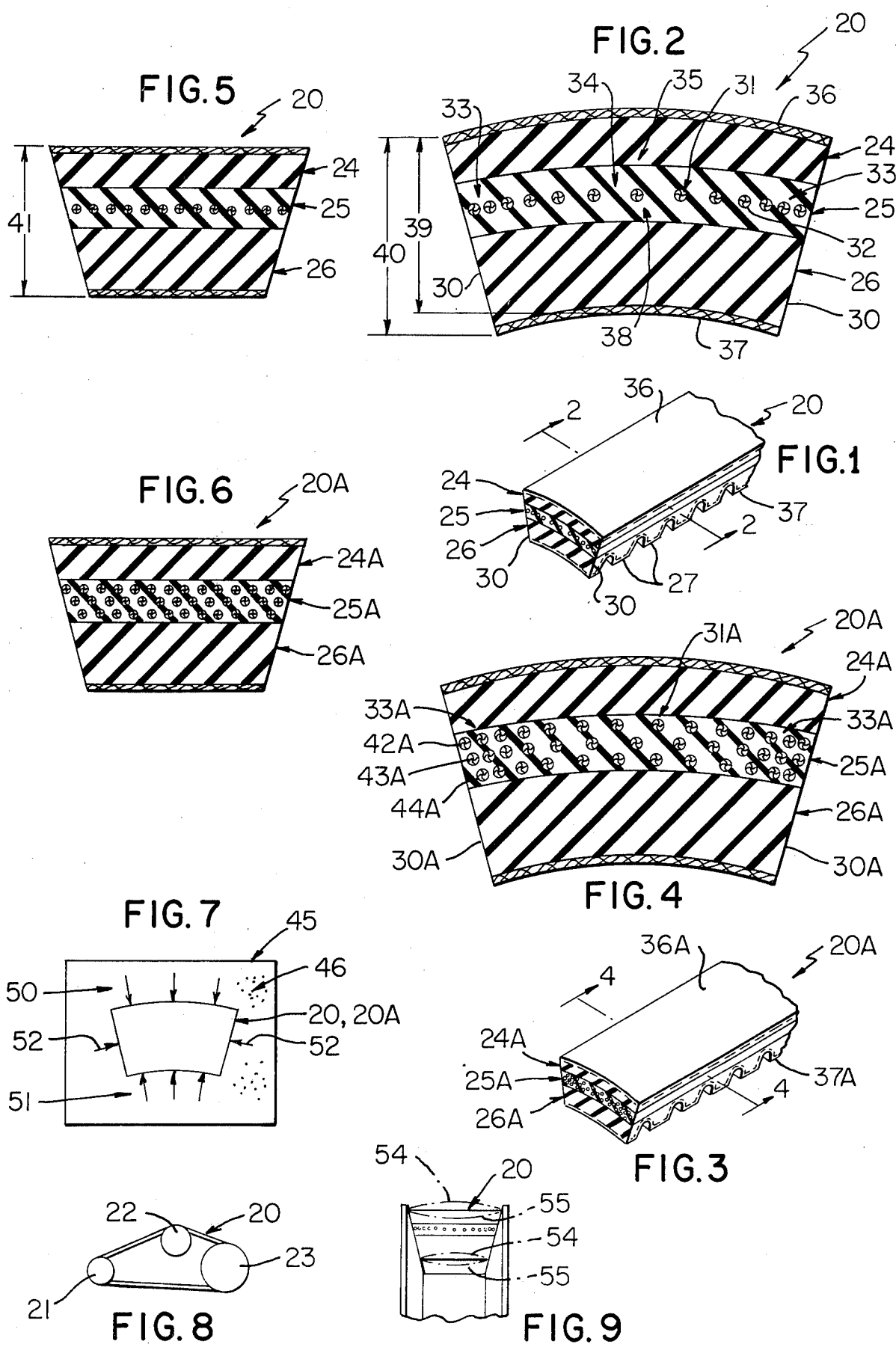

ENDLESS POWER TRANSMISSION BELT

BACKGROUND OF THE INVENTION

Toothed endless power transmission belts made primarily of elastomeric material have been proposed previously and are in wide use throughout industry and each of such toothed belts usually has improved flexibility while having better transverse rigidity than on untoothed belt.

It has also been proposed previously to provide a roughly trapezoidal endless power transmission belt with an upwardly convex top surface and load-carrying section in an effort to improve its transverse rigidity.

However, previously proposed belts including the above-mentioned belts are deficient because they do not provide both an optimum flexibility and transverse rigidity inasmuch as such belts when made to be more flexible will usually tend to dish when operated in sheaves under comparatively high load.

SUMMARY

It is a feature of this invention to provide a simple and economical endless power transmission belt made primarily of elastomeric material which has optimum flexibility yet has comparatively high transverse rigidity even under conditions of high load due to the unique configuration thereof.

Another feature of this invention is to provide a belt of the character mentioned which is in the form of a toothed belt which has an arched cross-sectional configuration.

Another feature of this invention is the provision of an endless power transmission belt made primarily of elastomeric material and which is adapted to be operated in an endless path with the belt comprising a tension section, a load-carrying section, and a compression section having a plurality of teeth arranged transverse the endless path and with the belt including all of its sections and teeth having an arched cross-sectional configuration under no load and with the arched configuration and teeth assuring that the belt has optimum transverse rigidity which assures the belt has a non-dished cross-sectional configuration under load.

Another feature of this invention is the provision of a method of making an endless power transmission belt of the character mentioned.

Accordingly, it is an object of this invention to provide an endless power transmission belt and method of making same having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a perspective view with parts in cross section, parts in elevation, and parts broken away particularly illustrating one exemplary embodiment of the endless power transmission belt of this invention;

FIG. 2 is an enlarged cross-sectional view taken essentially on the line 2—2 of FIG. 1;

FIG. 3 is a view similar to FIG. 1 illustrating another exemplary embodiment of the belt of this invention;

FIG. 4 is an enlarged cross-sectional view taken essentially on the line 4—4 of FIG. 3;

FIGS. 5 and 6 are cross-sectional views of belt bodies used to make the belts of FIGS. 1 and 3 respectively prior to final forming and curing of the belt bodies and showing that such belt bodies are flat and defined by essentially flat sections prior to curing thereof;

FIG. 7 is a schematic presentation particularly illustrating the manner in which the belt bodies of FIGS. 5 and 6 may be cured;

FIG. 8 is a schematic view particularly illustrating the belt of FIG. 1 being utilized with a plurality of sheaves to drive a comparatively high load;

FIG. 9 is a primarily schematic view illustrating the belt of FIG. 1 engaging an associated sheave while being operated under load and showing that it operates in a substantially non-dished manner while also illustrating by dotdash lines the dished configuration of a typical belt of ordinary construction being operated under load.

DESCRIPTION OF ILLUSTRATED EMBODIMENTS

Reference is now made to FIGS. 1-2 of the drawing which illustrate one exemplary embodiment of an endless power transmission belt of this invention which is designated generally by the reference numeral 20. The belt 20 has a substantially trapezoidal cross-sectional configuration and as shown in FIG. 8 the belt is particularly adapted to be operated in an endless path in a system, as is well known in the art, between a driving sheave 21 and a plurality of driven sheaves 22 and 23 so that the belt 20 operates under conditions of comparatively high load in the usual manner yet such belt has optimum flexibility and is capable of operating without a tendancy to stick in its associated sheaves and in a non-dishing manner due to the unique construction thereof and as will be explained in more detail subsequently.

The belt 20 is made primarily of elastomeric material and such belt comprises a tension section 24, a load-carrying section 25, and a compression section 26 which, as best seen in FIG. 1, has a plurality of teeth a representative few of which have been designated by the reference numeral 27 and such teeth 27 are arranged transverse the endless path of the belt and hence transverse the longitudinal dimension of such belt.

The toothed belt 20 has an arched cross-sectional configuration under no load or stated otherwise with the belt in an unloaded condition; and the arched configuration of the belt 20 is best seen in FIG. 2. The arched configuration of the belt 20 together with its transverse teeth 27 assure that the belt has optimum transverse rigidity and such rigidity assures that the belt may operate under comparatively high load without dishing. The term dishing is well known in the belt art and hence does not require a detailed explanation; however, basically a belt that dishes is one which bows downwardly, defining a dish-like top surface thereon, when operated between sheaves under load.

The belt 20 has opposed non-parallel sides each designated by the same reference numeral 30 and each of its sections 24, 25, and 26 has an arched or upwardly convex configuration and this includes the load-carrying section 25 which has load-carrying means therein designated generally by the reference numberal 31. The load-carrying means 31 of belt 20 is in the form of a helically wound load-carrying cord 32 which has a plurality of turns which extend in an arched configuration across the width or transverse dimension of the belt and the cord 32 has a comparatively close spacing between immediately adjacent turns thereof adjacent the sides 30 and as shown at 33 at each side in FIG. 2 to thereby provide a greater concentration of load-carrying means adjacent the sides 30 where the load on a loaded belt is ordinarily the greatest. The cord 32 has comparatively wide spacing, as shown at 34, between immediately adjacent turns thereof in the central portion 38 of the belt 20 and as shown at 35.

The belt 20 has a top cover 36 defining the top surface of the belt and such top cover 36 and hence top surface extend in an arched or upwardly convex configuration. Similarly the belt 20 has a bottom cover 37 defining the bottom surface of the belt 20 and the exposed surface of its teeth 27; and, the cover 37 extends not only in an undulating configuration in conformity to the contour of the belt teeth 27 but the cover also has an upwardly convex or arched configuration when viewed in cross section. The covers 36 and 37 may be of woven fabric or of any suitable material known in the art. Further, the belt 20 may also be provided with covers on its opposed non-parallel sides 30; however, in this example the belt 20 has its sides 30 in the form of raw-edged sides free of covers.

The teeth 27 of belt 20 are substantially identical and are arranged in equally spaced relation along the endless path of such belt 20. In addition, it will be seen in FIG. 2 that the completed cured belt 20 in its arched unloaded configuration has a comparatively small vertical thickness 39 through its central portion which is smaller than the vertical thickness 40 along its sides. Further, the thickness 39 should always be less than the thickness 41 of the uncured flat belt body of FIG. 5 which is used to make the belt 20 and the belt body of FIG. 5 is also designated by the reference numeral 20.

Another exemplary embodiment of the belt of the invention is illustrated in FIGS. 3 and 4 of the drawing. The belt illustrated in FIGS. 3 and 4 is similar to the belt 20; therefore, such belt will be designated by the reference numeral 20A and representative parts of the belt 20A will be designated in the drawing by the same reference numeral as in the belt 20 (whether or not such representative parts are mentioned in the specification) followed by the letter designation A and will not be described in detail.

The main difference between the belt 20A and the belt 20 is in the load-carrying section of belt 20A. In particular, it will be seen that the load-carrying means 31A in the load-carrying section 25A instead of being a single load-carrying cord is in the form of a plurality of three substantially helically wound load-carrying cords designated by the reference numerals 42A, 43A, and 44A. Each of the cords 42A, 43A, and 44A has a comparatively close spacing between immediately adjacent turns thereof adjacent the sides 30A and as illustrated at 33A to provide greater concentration of load-carrying means adjacent the sides 30A and each of the cords 42A, 43A, and 44A has a comparatively wide spacing as illustrated at 34A between immediately adjacent turns thereof adjacent the central portion of the belt 20A. It will also be seen that the cords 42A, 43A, and 44A are disposed in a plurality of layers between the tension section 24A and the compression section 26A and layers extend in arched or upwardly convex cross-sectional configuration.

The belts 20 and 20A may be made utilizing any suitable method known in the art; however, the belts 20 and 20A are preferably made using uncured toothed belts or belt bodies also designated by the reference numeral 20 and 20A in FIGS. 5 and 6 respectively with the belt bodies of FIGS. 5 and 6 having an overall flat trapezoidal cross-sectional configuration defined by a plurality of flat parallel sections. The flat parallel sections of each belt body 20 and 20A is comprised of a tension section, a load-carrying section, and a compression section which has a plurality of teeth arranged transverse the endless path of the belt and which define the toothed configuration of the belt and such sections are also designated by the reference numeral 24, 25, and 26 for the belt body 20 of FIG. 5 and 24A, 25A, and 26A for the belt body 20A of FIG. 6.

Each uncured flat belt body 20 and 20A as shown in FIGS. 5 and 6 is suitably cured in a controlled environment and as illustrated by the rectangular block 45 in FIG. 7. In particular, the controlled environment may include providing steam under controlled temperature and as indicated by a few random dots 46 in the block 45. The curing of each belt body 20 and 20A is preferably achieved utilizing controlled pressures provided by arched mold means designated by a top set of arrows 50, a bottom set of arrows 51, and side arrows 52 to define a permanently arched cross-sectional configuration in the final belt 20 and 20A after curing and cooling thereof as illustrated in FIGS. 2 and 4 respectively.

The arched configuration and the integral teeth of each belt 20 or 20A assure that each belt has transverse rigidity under load which is sufficient to enable operation thereof under conditions of high load in associated sheaves in a substantially non-dishing manner. In particular, when a belt such as the belt 20, for example, is operated in a system, such as the one illustrated in FIG. 8, under conditions of high load the belt cross section changes from its arched configuration (shown by dot-dash lines 54 in FIG. 9) to a substantially flat cross-sectional configuration whereby its top surface and all of its sections are disposed in a substantially flat non-dished arrangement as shown by solid lines, whereby the loaded belt 20 is capable of operating efficiently with minimum wear in its associated sheaves in a non-sticking manner and without heat build-up.

It will be appreciated that previously proposed belts not made in accordance with this invention when similarly operated under conditions of high load tend to dish as indicated by the dot-dash lines 55 in FIG. 9

Each belt 20 and 20A of this invention may be made utilizing any suitable elastomeric material; however, each of such belts is preferably made primarily of a suitable rubber compound. In addition, the environmental conditions of temperature and pressure used in curing each belt are determined by the material used in each belt and in accordance with techniques which are well known in the art.

The load-carrying cords of the belts 20 and 20A may be made of any suitable material utilized in the art for this purpose. Further, instead of providing load-carrying means in the form of helically wound cords the load-carrying means of the belts 20 and 20A may be any suitable load-carrying means which is employed in the art provided that during curing such load-carrying means becomes more concentrated near the belt sides than near the middle of the belt.

The load-carrying cord 32 of belt 20 has a comparatively close spacing and hence close concentration between adjacent turns at the sides of the belt 20 and a wider spacing between turns at the center of the belt. Similarly, each load-carrying cord 42A, 43A, and 44A of the belt 20A has a comparatively close spacing and hence close concentration between adjacent turns at the side of the belt 20A and a wider spacing between turns at the center of such belt. In addition, for each belt 20 and 20A the load-carrying means thereof extends in an arched configuration. It will be appreciated that curing under controlled temperature and the pressure in arched mold means causes each load-carrying cord to be distributed in its associated belt 20 or 20A as described.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt made primarily of elastomeric material and being adapted to be operated in an endless path with said belt comprising, a tension section, a load-carrying section including load-carrying means, and a compression section having a plurality of teeth arranged transverse said endless path, said belt having a central portion and opposed non-parallel sides, said belt including all of its sections and teeth having an arched cross-sectional configuration under no load, said arched configuration and teeth providing optimum transverse rigidity and a non-dished cross-sectional configuration under load, said load-carrying means having a comparatively high concentration thereof adjacent said opposed sides where the load concentration is greatest under load and said load-carrying means have a comparatively low concentration thereof at said central portion.

2. A belt as set forth in claim 1 in which said load-carrying means comprises at least one substantially helically wound load-carrying cord having a comparatively close spacing between immediately adjacent turns thereof adjacent said sides to provide said comparatively high concentration of load-carrying means and having a comparatively wide spacing between immediately adjacent turns thereof at said central portion to provide said comparatively low concentration of load-carrying means.

3. A belt as set forth in claim 2 in which said cord when viewed in cross section defines an arched layer under said no load.

4. A belt as set forth in claim 2 in which said tension section has a top cover defining the top surface of said belt and said compression section has a bottom cover defining the bottom surface of said belt and the exposed surface of its teeth.

5. A belt as set forth in claim 4 in which said sides are raw-edged sides free of covers.

6. A belt as set forth in claim 2 in which said belt in its arched configuration has a smaller vertical thickness through its central portion than along its sides.

7. A belt as set forth in claim 2 in which said belt is made primarily of elastomeric material in the form of rubber.

8. A belt as set forth in claim 2 in which said teeth are substantially identical and are arranged in equally spaced relation along said endless path.

9. A belt as set forth in claim 2 made primarily of elastomeric material in the form of rubber in which said tension section has a top cover defining the top surface of said belt, said compression section has a bottom cover defining the bottom surface of said belt and the exposed surface of its teeth, said sides are raw-edged sides free of covers, and said belt in its arched configuration has a smaller vertical thickness through its central portion than along its sides.

10. A belt as set forth in claim 1 in which said load-carrying means comprises a plurality of substantially helically wound load-carrying cords with each of said cords having a comparatively close spacing between immediately adjacent turns thereof adjacent said sides to provide said comparatively high concentration of load-carrying means and each of said cords having a comparatively wide spacing between immediately adjacent turns thereof at said central portion to provide said comparatively low concentration of load-carrying means.

11. A belt as set forth in claim 10 in which said plurality of cords define a plurality of layers between said tension section and compression sections.

12. A belt as set forth in claim 11 in which each of said plurality of layers is disposed in an arched configuration under said no load.

13. A belt as set forth in claim 12 made primarily of elastomeric material in the form of rubber and in which said belt in its arched configuration has a smaller vertical thickness through its central portion than along its sides.

14. A method of making an arched toothed endless power transmission belt made primarily of elastomeric material and which has transverse rigidity and longitudinal flexibility and is adapted to be operated in an endless path; said method comprising the steps of; providing an uncured toothed belt having a trapezoidal cross-sectional configuration and having a plurality of flat parallel sections defined by a tension section, a load-carrying section, and a compression section which has a plurality of teeth arranged transverse said endless path which define the toothed configuration of said belt; and curing said belt in a controlled environment to define a permanently arched cross-sectional configuration in said belt including all of its sections with said belt under no load, said arched configuration and teeth thereof assuring said belt has said transverse rigidity while assuring said belt has a non-dished cross-sectional configuration under load.

15. A method as set forth in claim 14 in which said curing step comprises curing said belt in said controlled environment in the form of a steam environment while subjecting said belt to controlled pressures.

16. A method as set forth in claim 15 in which said curing step comprises curing said belt in said controlled environment using arched mold means.

17. A method as set forth in claim 16 in which said providing step comprises providing said uncured belt made primarily of uncured rubber.

18. A method as set forth in claim 16 in which said curing step comprises employing said arched mold means which compacts said belt so that upon curing thereof the completed belt has said arched configuration which has a smaller vertical thickness through its central portion than along its sides.

19. A method as set forth in claim 18 in which said curing step provides a greater concentration of load-carrying means adjacent opposed non-parallel sides of the trapezoidal configuration.

* * * * *